United States Patent
Hawener et al.

(10) Patent No.: US 6,478,106 B2
(45) Date of Patent: Nov. 12, 2002

(54) DEVICE FOR FORCED GUIDING OF A MOTOR AND/OR POWERTRAIN WITH A CRASH CASE

(75) Inventors: Rainer Hawener, Tiefenbronn; Stefan Rugies, Markgroeningen, both of (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 09/891,272

(22) Filed: Jun. 27, 2001

(65) Prior Publication Data

US 2001/0054521 A1 Dec. 27, 2001

(30) Foreign Application Priority Data

Jun. 27, 2000 (DE) .......................................... 100 31 165

(51) Int. Cl.⁷ .............................. B60K 5/00; B60K 17/00
(52) U.S. Cl. ........................ 180/232; 180/346; 180/382; 180/312
(58) Field of Search ................................. 180/232, 312, 180/346, 374, 377, 382, 274; 280/784

(56) References Cited

U.S. PATENT DOCUMENTS 3,347,501 A * 10/1967 Eimeren ....................... 180/232
6,213,245 B1 * 4/2001 Murata et al. ............... 180/312
6,390,224 B1 * 5/2002 Yoshida ....................... 180/312

FOREIGN PATENT DOCUMENTS

DE 42 30 722 A1 4/1993
JP 5-319103 * 12/1993

* cited by examiner

Primary Examiner—Peter C. English
(74) Attorney, Agent, or Firm—Crowell & Moring LLP

(57) ABSTRACT

For restraint guidance of the transmission housing in a crash situation, a crash skid is provided on the underside of the transmission housing and has an inclined surface which faces a cross arm. In the event of a shifting of the transmission housing counter to the direction of travel, the inclined surface introduces a restraint guidance of the transmission housing obliquely upward above the cross arm.

8 Claims, 2 Drawing Sheets

DEVICE FOR FORCED GUIDING OF A MOTOR AND/OR POWERTRAIN WITH A CRASH CASE

BACKGROUND OF THE INVENTION

This application claims the priority of German Patent Document 100 31 165.2, filed Jun. 27, 2000.

The present invention relates to a device for restraint guidance of a motor and/or transmission unit in a crash, and more particularly, to a crash skid for a transmission housing which is held by at least one elastic bearing on a cross arm.

A motor vehicle with a transmission unit and a stiff underframe arranged area-wise behind it is described in DE 42 30 722 Al. A bearing surface pointing obliquely backward is provided on the underframe and a corresponding counter bearing surface constructed on the housing is provided on the unit. In the event of a crash, the unit is deflected downward toward the wheel base surface.

SUMMARY OF THE INVENTION

An object of the present invention is to create a device for a motor and/or transmission unit which is movably restraint-guided in its direction of motion counter to the direction of travel in the event of a crash, which device can be a simply interchangeable and installable part.

This object has been achieved in accordance with the present invention by providing that a crash skid is connected with the transmission housing, the crash skid having an inclined bearing surface directed counter to a direction of travel F of the motor vehicle and facing a bearing mounting in the cross arm. Thereby, in a crash position, the elastic bearing is arranged to be sheared off with the inclined bearing surface riding on the bearing mounting.

The advantages realized with the present invention chiefly reside in the transmission unit being able to slide in a crash situation against the direction of travel without basic hindrance and damage to the attaching parts and the transmission housing can largely be avoided. This has been achieved with a guide configured as a crash skid connected with the transmission housing which has an inclined bearing surface directed counter to the direction of travel at an angle. This inclined bearing surface faces a bearing mounting in the cross arm in which the elastic bearing can be sheared off in a crash position in connection with the bearing surface riding on the bearing mounting. The transmission bearing in the bearing mounting of the cross arm is fastened through a projecting bearing core by a bracket on the transmission housing. In the event of a crash, the bearing core can follow the crash motion of the transmission housing and moreover tear out of the elastic elements of the transmission housing so that the free motion of the unit becomes possible.

Owing to the coupling of the actions of the crash skid in connection with the tearing out of the elastic bearing element of the transmission bearing, the transmission unit can be slid out over the cross arm backward counter to the direction of travel. The bearing core is for this purpose guided out of the bearing mounting and can swivel away and consequently tear off in a crash situation.

The crash skid is for this purpose constructed somewhat Z-shaped and fastened with an upper first bent end on the transmission housing whereby the obliquely running bearing surface is arranged with its lower approximately horizontal running end lying exposed toward the transmission housing. The lower end of the crash skid has outward projecting guides on each side which face the bearing mounting projecting over the cross arm and which can slide on the rounded bearing mounting in a crash position. A guidance in the longitudinal direction of the vehicle takes place on the rounded bearing mounting through these outward projecting guides.

A hard impact is avoided through the inclined surface and lower end of the crash skid arranged at a distance to the transmission housing, and a sprung installation is attained on the bearing mounting or the cross arm in a crash situation. Molded bracing ribs between the guides extend longitudinally and result in a stiffening of the crash skid.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE EMBODIMENTS

In a motor vehicle, a drive unit is provided in front at least consisting of an internal combustion engine and a transmission 1 which is braced on a cross arm 3 of the vehicular body through at least one transmission bearing 2. Further bearings for the internal combustion engine are arranged in front on the body side.

Figure 1:
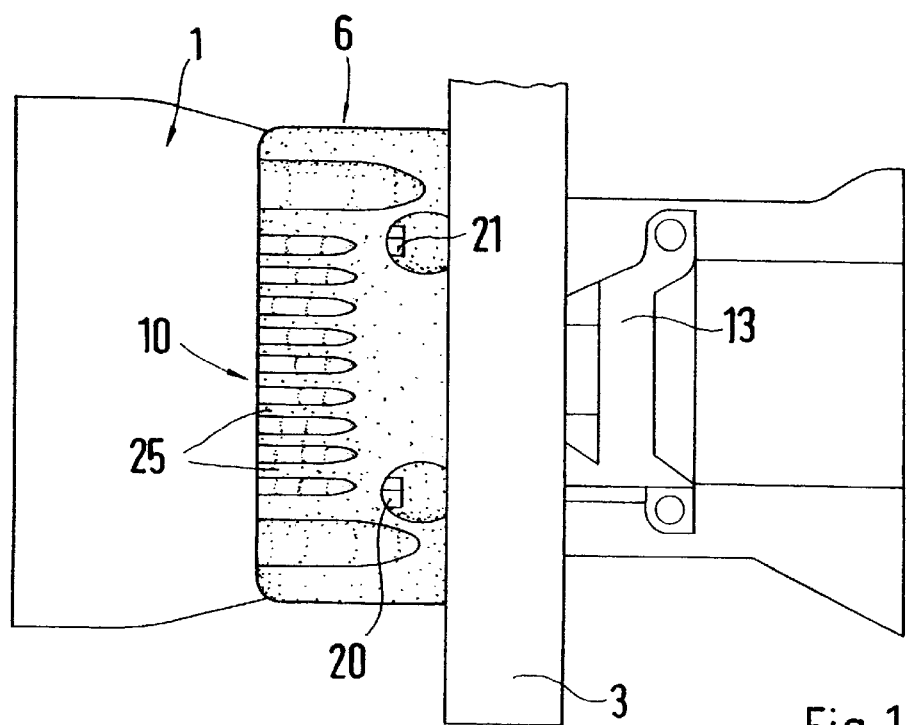
FIG. 1 is a bottom view of a crash skid according to the present invention.
Figure 2:
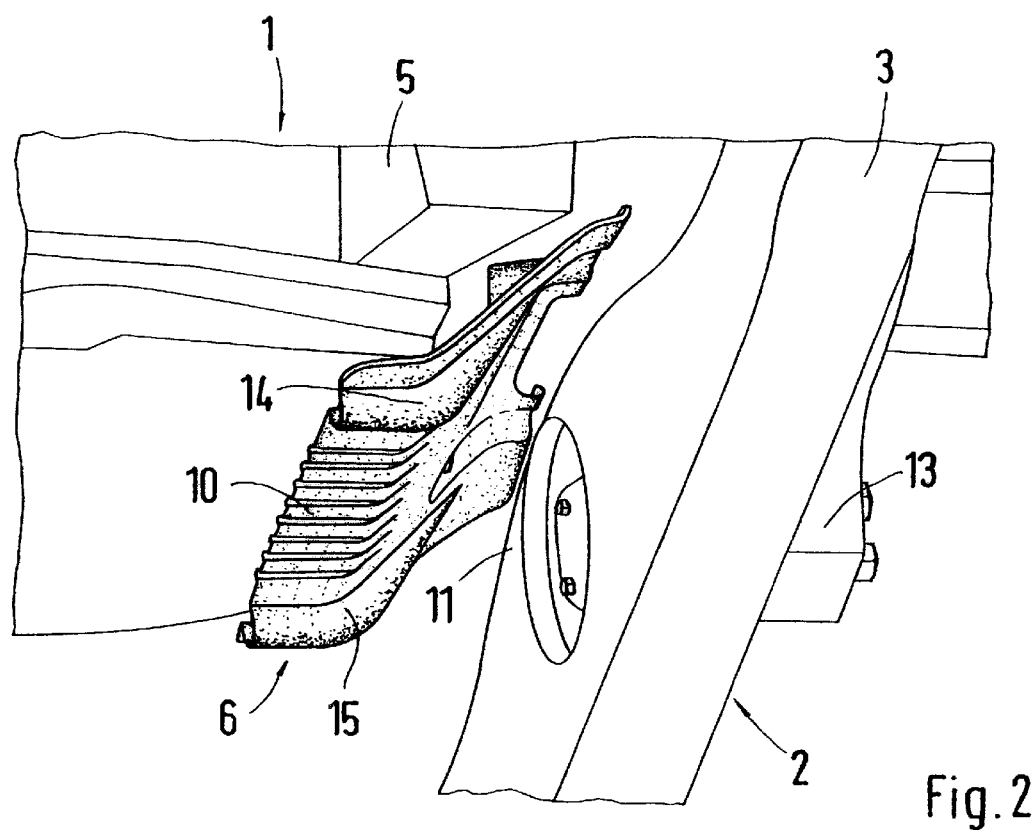
FIG. 2 is a perspective view of the crash skid viewed from below.
Figure 3:
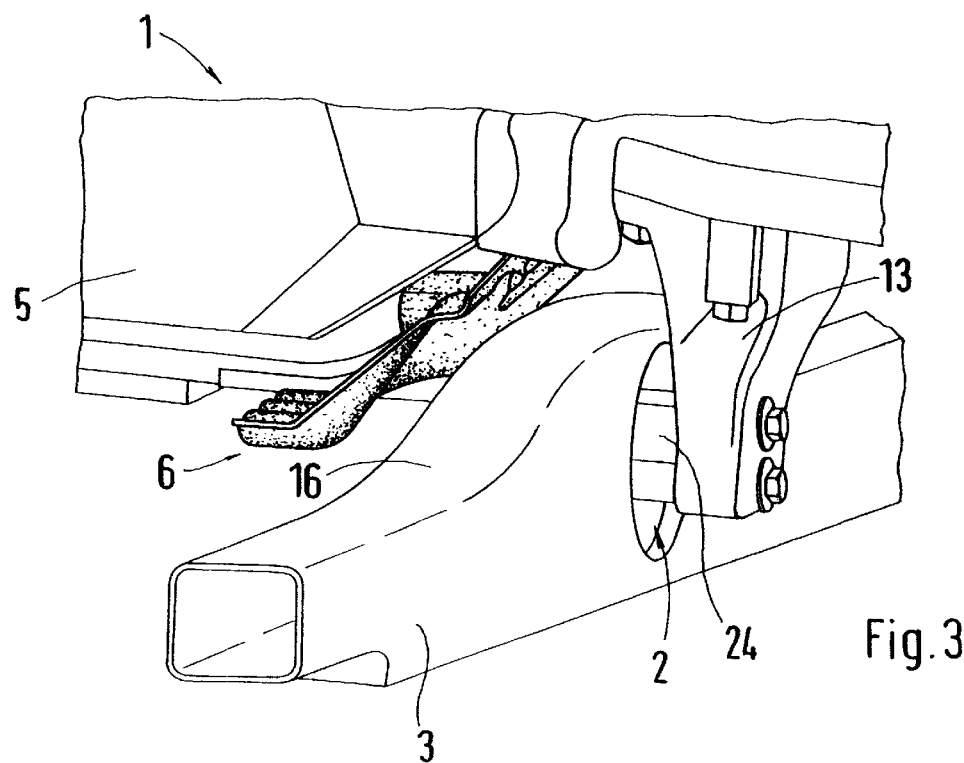
FIG. 3 is a perspective view of the crash skid with cross arm.
Figure 4:
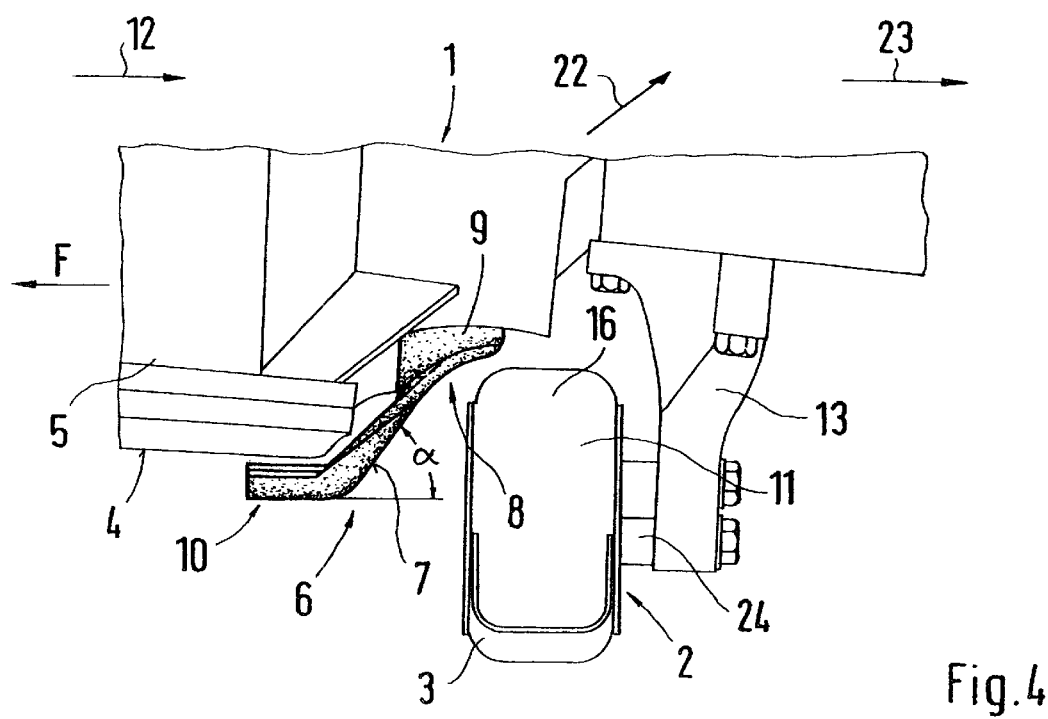
FIG. 4 is a side view of the crash skid with cross arm and transmission bearing according to the present invention.

On the underside 4 of the transmission housing 5, a so-called crash skid 6 is arranged in the area of a shoulder. This consists of a Z-shaped sheet or casting with an inclined surface 7 directed at an angle a counter to the direction of travel F (FIG. 4). An upper bent first end 8 with a fastening portion 9 and a lower bent second end 10 are connected with the inclined surface 7. The lower end 10 lies approximately on a horizontal plane.

The inclined surface 7 of the crash skid faces a bearing mounting 11 in the cross arm 3 such that in the event of a crash and a motion of the associated unit in the direction of arrow 12 (FIG. 4), the inclined surface 7 strikes against the bearing mounting 11 and slides the unit over the inclined surface 7 upwardly in arrow direction 22 through the inclined surface riding on the bearing mounting 11. Through this sliding of the transmission housing 5, the transmission bearing 2 is forced to break away, which breaking away takes place through the shifting of the bearing core 24 held in elastic elements and connected with the transmission housing 5 by way of a bracket 13. In this way, the motion of the transmission housing 5 is not hindered in a crash situation.

Outward projecting longitudinal guides 14, 15 are provided on the inclined surface 7 and in the lower bent end 10 of the crash skid 6. These are applied first to the projecting outer wall 16 of the bearing mounting 11 in the event of a shifting of the transmission housing 5 and guide the drive unit in its sliding motion.

The lower end 10 of the crash skid 6 has molded bracing ribs 25 running longitudinally to bring about a longitudinal stiffening and produce a certain pliability crosswise.

The crash skid 6 is joined with the transmission housing 5 at least on the upper end 8 through two fastening screws 20, 21 whereby the inclined surface 7 and the lower end 10 are arranged at a distance to the transmission housing 5.

In a crash situation, the unit will move counter to the direction of travel F first in the direction of the arrow 12. The inclined surface 7 of the crash skid 6 is then applied to the projecting outer wall 16 of the transmission mounting 11 and after this slides along the outer wall 16 in the direction of arrow 22 approximately inclined in an upward direction over the cross arm 3, whereby the crash skid 6 engages the transmission housing 5. After reaching the lower end 10 of the crash skid 6, an approximately horizontal motion of the transmission housing 5 in the direction of arrow 23 is introduced. During the motion process of the transmission housing 5, the bearing core 24 tears off from its elastic bearing elements of the transmission bearing 2 so that the motion of the transmission housing 5 is no longer prevented.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Device for restraint guidance of a motor and transmission unit in the event of a crash comprising a guide on a transmission housing which is operatively held by at least one elastic bearing on a cross arm of a motor vehicle wherein the guide is configured as a crash skid connected with the transmission housing, the crash skid having an inclined bearing surface directed counter to a direction of travel of the motor vehicle and facing a bearing mounting in the cross arm such that, in a crash, the elastic bearing is arranged to be sheared off with the inclined bearing surface riding on the bearing mounting.

2. Device according to claim 1, wherein the crash skid is configured to be approximately Z-shaped and fastened with an upper first bent end on the transmission housing, whereby the inclined bearing surface is exposed toward the transmission housing with a lower approximately horizontal second end of the crash skid.

3. Device according to claim 2, wherein at least the bearing surface and the second end of the crash skid have outward projecting longitudinal guides on opposite sides facing the bearing mounting so as to slide in the event of a crash on a rounded surface of the bearing mounting.

4. Device according to claim 3, wherein, between the longitudinal guides, bracing ribs are arranged at least in the second end of the crash skid.

5. Device according to claim 1, wherein the elastic bearing is fastened to the transmission housing by a bracket and includes a bearing core projecting from the bearing mounting so that, in the event of a crash, the bearing core follows a motion of the transmission housing so as to be torn out of elastic elements of the elastic bearing.

6. Device according to claim 5, wherein the crash skid is configured to be approximately Z-shaped and fastened with an upper first bent end on the transmission housing, whereby the inclined bearing surface is exposed toward the transmission housing with a lower approximately horizontal second end of the crash skid.

7. Device according to claim 6, wherein at least the bearing surface and the second end of the crash skid have outward projecting longitudinal guides on opposite sides facing the bearing mounting so as to slide in the event of a crash on a rounded surface of the bearing mounting.

8. Device according to claim 7, wherein between the longitudinal guides, bracing ribs are arranged at least in the second end of the crash skid.

* * * * *